United States Patent
Li et al.

(10) Patent No.: US 9,788,166 B2
(45) Date of Patent: Oct. 10, 2017

(54) METHOD, APPARATUS, AND SYSTEM FOR SCREENING AUGMENTED REALITY CONTENT

(71) Applicant: Huawei Device Co., Ltd., Shenzhen (CN)

(72) Inventors: Guoqing Li, Beijing (CN); Xinmiao Chang, Beijing (CN); Zhihao Jin, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 0 days.

(21) Appl. No.: 14/955,534

(22) Filed: Dec. 1, 2015

(65) Prior Publication Data
US 2016/0088442 A1 Mar. 24, 2016

Related U.S. Application Data

(63) Continuation of application No. PCT/CN2014/084060, filed on Aug. 11, 2014.

(30) Foreign Application Priority Data

Aug. 23, 2013 (CN) .......................... 2013 1 0371509

(51) Int. Cl.
*H04W 24/00* (2009.01)
*H04W 4/04* (2009.01)
*H04W 4/20* (2009.01)

(52) U.S. Cl.
CPC ............. *H04W 4/04* (2013.01); *H04W 4/043* (2013.01); *H04W 4/206* (2013.01)

(58) Field of Classification Search
CPC ....... H04W 4/04; H04W 4/043; H04W 4/206; G06T 11/00

(Continued)

(56) References Cited

U.S. PATENT DOCUMENTS 7,409,335 B1 8/2008 Horvitz et al.
2010/0161213 A1 6/2010 Tajima et al.
(Continued)

FOREIGN PATENT DOCUMENTS

CN 101726284 A 6/2010
CN 102155952 A 8/2011
(Continued)

OTHER PUBLICATIONS

Partial English Translation and Abstract of Chinese Patent Application No. CN101726284, Nov. 26, 2015, 3 pages.
(Continued)

*Primary Examiner* — Wayne Cai
(74) *Attorney, Agent, or Firm* — Fish & Richardson P.C.

(57) ABSTRACT

A method, an apparatus, and a system for screening AR content is presented. The method includes shooting, by a terminal, a panoramic photo of a location of the terminal, and determining location information of the terminal and related information of a first target according to the panoramic photo; sending, by the terminal to a server, a first request message that carries an identifier of the terminal and the location information of the terminal; receiving, by the terminal, a first response message that carries at least one behavior and is from the server; sending, by the terminal, a second request message to the server; receiving, by the terminal, a second response message that carries AR content corresponding to the first behavior; and presenting, by the terminal, the first target and the AR content after combination according to the related information of the first target.

20 Claims, 6 Drawing Sheets

(58) Field of Classification Search
USPC ............ 455/414.1–414.3, 457, 456.1–456.6; 345/632, 633
See application file for complete search history.

(56) References Cited

U.S. PATENT DOCUMENTS

| | | |
|---|---|---|
| 2011/0258049 A1 | 10/2011 | Ramer et al. |
| 2012/0044163 A1 | 2/2012 | Sim et al. |
| 2012/0194547 A1* | 8/2012 | Johnson .................. G06T 11/00 345/632 |
| 2012/0215635 A1 | 8/2012 | Ramer et al. |
| 2014/0304321 A1* | 10/2014 | Stroila .................... H04L 67/38 709/203 |
| 2015/0138231 A1 | 5/2015 | Wang et al. |

FOREIGN PATENT DOCUMENTS

| | | |
|---|---|---|
| CN | 102801788 A | 11/2012 |
| JP | H08249307 | 9/1996 |
| JP | 20109261 A | 1/2010 |
| JP | 2010020490 | 1/2010 |
| JP | 2011123807 | 6/2011 |
| JP | 2012216135 | 11/2012 |
| WO | 2009054130 A1 | 4/2009 |
| WO | 2012155179 A1 | 11/2012 |

OTHER PUBLICATIONS

Partial English Translation and Abstract of Chinese Patent Application No. CN102155952, Part 1, Nov. 26, 2015, 6 pages.
Partial English Translation and Abstract of Chinese Patent Application No. CN102155952, Nov. 26, 2015, 3 pages.
Foreign Communication From a Counterpart Application, European Application No. 14838385.4, Extended European Search Report dated Mar. 22, 2016, 7 pages.
Foreign Communication From a Counterpart Application, PCT Application No. PCT/CN2014/084060, English Translation of International Search Report dated Nov. 18, 2014, 2 pages.
Foreign Communication From a Counterpart Application, PCT Application No. PCT/CN2014/084060, English Translation of Written Opinion dated Nov. 18, 2014, 7 pages.
Mitsutaka Susuki, et al., "Extrinsic Camera Parameter Estimation from a Still Image Based on Feature Landmark Database", Transactions of the Virtual Reality Society of Japan, Specified nonprofit corporation Virtual Reality Society of Japan, Jun. 30, 2008 (year/month/day), vol. 13, No. 2, pp. 161 to 170.
Japanese Office Action issued in Japanese Application No. 2016-520271, mailed on Jan. 4, 2017, 5 pages.
Notice of Allowance issued in Korean Application No. 10-2015-7035813 on Apr. 26, 2017, 3 pages (partial translation).
Office Action issued in Japanese Application No. JP2010-009261, dated May 30, 2017; 5 pages, 5 pages translated.

* cited by examiner

METHOD, APPARATUS, AND SYSTEM FOR SCREENING AUGMENTED REALITY CONTENT

CROSS-REFERENCE TO RELATED APPLICATIONS

This application is a continuation of International Application No. PCT/CN2014/084060, filed on Aug. 11, 2014, which claims priority to Chinese Patent Application No. 201310371509.2, filed on Aug. 23, 2013, both of which are hereby incorporated by reference in their entireties.

TECHNICAL FIELD

The present disclosure relates to the communications field, and in particular, to a method, an apparatus, and a system for screening augmented reality content.

BACKGROUND

Augmented reality (AR) is a technology for helping people to acquire related information of articles in the real world in a more intuitive and visual manner. A working procedure of an AR system includes four steps: sensing, identifying, matching, and rendering.

An existing map application may provide a user with a query service based on a point of interest (POI) of a location. A terminal on which the map application is installed first determines a current location (longitude and latitude) of a user using a global positioning system (GPS) or a cell identity (Cell ID) of a cellular network, then queries a database according to the current location, and further acquires, from the database, POIs such as a restaurant, a bank, a shopping mall, and a station that have been registered and are near the current location. The user may also input, in the map application, a location in which the user is interested, and the map application searches the database, and locates the location on a map, thereby finding POIs near the location. After receiving a question and corresponding data that are input by the user, and performing natural language processing on the question, an existing question-answering system transfers the question to a query subsystem, and the query subsystem deduces an answer to the question, gets the related answer from a knowledge base, and outputs the answer to the user.

However, the foregoing map application requires the user to have a clear knowledge of a POI requested by the user. In other words, the user needs to analyze, according to a requirement of the user, a POI to which the user intends to go. The foregoing question-answering system can only process text data of a single type, but cannot process data of a complex type, and if the question input by the user is not precise enough, the question-answering system cannot meet an information requirement of the user.

SUMMARY

Embodiments of the present disclosure provide a method, an apparatus, and a system for screening augmented reality content, which can dynamically select, in real time according to a behavior selected by a user, augmented reality content that can most meet a requirement of the user, thereby meeting an information requirement of the user.

To achieve the foregoing objective, the following technical solutions are used in the embodiments of the present disclosure:

According to a first aspect, an embodiment of the present disclosure provides a method for screening augmented reality AR content, including: shooting, by a terminal, a panoramic photo of a location of the terminal when an application that is in the terminal and for acquiring location information is triggered, and determining location information of the terminal and related information of a first target according to the panoramic photo; sending, by the terminal, a first request message to a server, where the first request message carries an identifier of the terminal and the location information of the terminal; receiving, by the terminal, a first response message that carries at least one behavior and is from the server, where the at least one behavior is determined by the server according to the identifier of the terminal, the location information of the terminal, and conditional probabilities of different behaviors; sending, by the terminal, a second request message to the server when determining that a first behavior in the at least one behavior is selected, where the second request message carries information about the first behavior; receiving, by the terminal, a second response message that carries AR content corresponding to the first behavior and that is from the server; and presenting, by the terminal, the first target and the AR content after combination according to the related information of the first target.

In a first possible implementation manner of the first aspect, before the shooting, by a terminal, a panoramic photo of a location of the terminal when an application that is in the terminal and for acquiring location information is triggered, and determining location information of the terminal and related information of a first target according to the panoramic photo, the method further includes: reading, by the terminal, tag information of a second target; and sending, by the terminal, a first record event to the server, where the first record event triggers the server to classify the first record event according to the identifier of the terminal and the location information of the terminal and determine a probability of the first record event, and the first record event includes a behavior of reading the tag information of the second target by the terminal.

With reference to the first aspect or the first possible implementation manner of the first aspect, in a second possible implementation manner, after the sending, by the terminal, a second request message to the server when determining that a first behavior in the at least one behavior is selected, where the second request message carries information about the first behavior, the method further includes: sending, by the terminal, a second record event to the server, where the second record event triggers the server to classify the second record event according to the identifier of the terminal and the location information of the terminal and determine a probability of the second record event and a conditional probability of the second record event, and the second record event includes a behavior of selecting the first behavior in the at least one behavior.

With reference to the second possible implementation manner of the first aspect, in a third possible implementation manner, the related information of the first target includes location information of the first target, and the second record event further includes the location information of the first target.

With reference to any implementation manner of the first possible implementation manner to the third possible implementation manner of the first aspect, in a fourth possible implementation manner, after the reading, by the terminal, tag information of a second target, the method further includes: acquiring, by the terminal, an identifier of the second target according to the tag information of the second target; sending, by the terminal to the server, a third request message that carries the identifier of the second target; and receiving, by the terminal, a third response message that carries location information of the second target and is returned by the server.

With reference to the fourth possible implementation manner of the first aspect, in a fifth possible implementation manner, the first record event further includes the location information of the second target.

According to a second aspect, an embodiment of the present disclosure provides a method for screening AR content, including: receiving, by a server, a first request message from a terminal, where the first request message carries an identifier of the terminal and location information of the terminal; determining, by the server, at least one behavior according to the identifier of the terminal, the location information of the terminal, and conditional probabilities of different behaviors; sending, by the server to the terminal, a first response message that carries the at least one behavior; receiving, by the server, a second request message from the terminal, where the second request message carries information about a first behavior, and the first behavior is a behavior selected in the at least one behavior; and sending, by the server to the terminal, a second response message that carries AR content corresponding to the first behavior, where the second response message triggers the terminal to present a first target and the AR content after combination according to related information of the first target, and the location information of the terminal and the related information of the first target are determined according to a panoramic photo of a location of the terminal after the terminal shoots the panoramic photo when an application that is in the terminal and for acquiring location information is triggered.

In a first possible implementation manner of the second aspect, before the receiving, by a server, a first request message from a terminal, the method further includes: receiving, by the server, a first record event from the terminal, where the first record event includes a behavior of reading tag information of a second target by the terminal; and classifying, by the server, the first record event according to the identifier of the terminal and the location information of the terminal, and determining a probability of the first record event.

With reference to the second aspect or the first possible implementation manner of the second aspect, in a second possible implementation manner, after the receiving, by the server, a second request message from the terminal, the method further includes: receiving, by the server, a second record event from the terminal, where the second record event includes a behavior of selecting the first behavior in the at least one behavior; and classifying, by the server, the second record event according to the identifier of the terminal and the location information of the terminal, and determining a probability of the second record event and a conditional probability of the second record event.

With reference to the second possible implementation manner of the second aspect, in a third possible implementation manner, the related information of the first target includes location information of the first target, and the second record event further includes the location information of the first target.

With reference to any implementation manner of the first possible implementation manner to the third possible implementation manner of the second aspect, in a fourth possible implementation manner, before the receiving, by the server, a first record event from the terminal, the method further includes: receiving, by the server, a third request message that carries an identifier of the second target and is from the terminal, where the identifier of the second target is acquired by the terminal according to the tag information of the second target; and sending, by the server to the terminal, a third response message that carries location information of the second target.

With reference to the fourth possible implementation manner of the second aspect, in a fifth possible implementation manner, the first record event further includes the location information of the second target.

According to a third aspect, an embodiment of the present disclosure provides a terminal, including: a determining unit configured to shoot a panoramic photo of a location of the terminal when an application that is in the terminal and for acquiring location information is triggered, and determine location information of the terminal and related information of a first target according to the panoramic photo; a sending unit configured to send a first request message to a server, where the first request message carries an identifier of the terminal and the location information, which is determined by the determining unit, of the terminal; a receiving unit configured to receive a first response message that carries at least one behavior and is from the server, where the at least one behavior is determined by the server according to the identifier of the terminal, the location information of the terminal, and conditional probabilities of different behaviors, where the sending unit is further configured to send a second request message to the server when the terminal determines that a first behavior in the at least one behavior is selected, where the second request message carries information about the first behavior; and the receiving unit is further configured to receive a second response message that carries AR content corresponding to the first behavior and that is from the server; and a display unit configured to present the first target and the AR content, which is received by the receiving unit, after combination according to the related information, which is determined by the determining unit, of the first target.

In a first possible implementation manner of the third aspect, before the determining unit shoots the panoramic photo of the location of the terminal when the application that is in the terminal and for acquiring location information is triggered, and determines the location information of the terminal and the related information of the first target according to the panoramic photo, the determining unit is further configured to read tag information of a second target; and the sending unit is further configured to send a first record event to the server, where the first record event triggers the server to classify the first record event according to the identifier of the terminal and the location information of the terminal and determine a probability of the first record event, and the first record event includes a behavior of reading the tag information of the second target by the determining unit.

With reference to the third aspect or the first possible implementation manner of the third aspect, in a second possible implementation manner, after the sending unit sends the second request message to the server, the sending unit is further configured to send a second record event to the server, where the second record event triggers the server to classify the second record event according to the identifier of the terminal and the location information of the terminal and determine a probability of the second record event and a conditional probability of the second record event, and the second record event includes a behavior of selecting the first behavior in the at least one behavior.

With reference to the second possible implementation manner of the third aspect, in a third possible implementation manner, the related information, which is determined by the determining unit, of the first target includes location information of the first target, and the second record event sent by the sending unit further includes the location information of the first target.

With reference to any implementation manner of the first possible implementation manner to the third possible implementation manner of the third aspect, in a fourth possible implementation manner, after the determining unit reads the tag information of the second target, the determining unit is further configured to acquire an identifier of the second target according to the tag information of the second target; the sending unit is further configured to send, to the server, a third request message that carries the identifier of the second target; and the receiving unit is further configured to receive a third response message that carries location information of the second target and is returned by the server.

With reference to the fourth possible implementation manner of the third aspect, in a fifth possible implementation manner, the first record event sent by the sending unit further includes the location information of the second target.

According to a fourth aspect, an embodiment of the present disclosure provides a server, including: a receiving unit configured to receive a first request message from a terminal, where the first request message carries an identifier of the terminal and location information of the terminal; a determining unit configured to determine at least one behavior according to the identifier of the terminal and the location information of the terminal that are received by the receiving unit and conditional probabilities of different behaviors; and a sending unit configured to send, to the terminal, a first response message that carries the at least one behavior determined by the determining unit, where the receiving unit is further configured to receive a second request message from the terminal, where the second request message carries information about a first behavior, and the first behavior is a behavior selected in the at least one behavior; and the sending unit is further configured to send, to the terminal, a second response message that carries AR content corresponding to the first behavior, where the second response message triggers the terminal to present a first target and the AR content after combination according to related information of the first target, and the location information of the terminal and the related information of the first target are determined according to a panoramic photo of a location of the terminal after the terminal shoots the panoramic photo when an application that is in the terminal and for acquiring location information is triggered.

In a first possible implementation manner of the fourth aspect, before the receiving unit receives the first request message from the terminal, the receiving unit is further configured to receive a first record event from the terminal, where the first record event includes a behavior of reading tag information of a second target by the terminal; and the determining unit is further configured to classify the first record event according to the identifier of the terminal and the location information of the terminal, and determine a probability of the first record event.

With reference to the fourth aspect or the first possible implementation manner of the fourth aspect, in a second possible implementation manner, after the receiving unit receives the second request message from the terminal, the receiving unit is further configured to receive a second record event from the terminal, where the second record event includes a behavior of selecting the first behavior in the at least one behavior; and the determining unit is further configured to classify the second record event according to the identifier of the terminal and the location information of the terminal, and determine a probability of the second record event and a conditional probability of the second record event.

With reference to the second possible implementation manner of the fourth aspect, in a third possible implementation manner, the related information of the first target includes location information of the first target, and the second record event received by the receiving unit further includes the location information of the first target.

With reference to any implementation manner of the first possible implementation manner to the third possible implementation manner of the fourth aspect, in a fourth possible implementation manner, before the receiving unit receives the first record event from the terminal, the receiving unit is further configured to receive a third request message that carries an identifier of the second target and is from the terminal, where the identifier of the second target is acquired by the terminal according to the tag information of the second target; and the sending unit is further configured to send, to the terminal, a third response message that carries location information of the second target.

With reference to the fourth possible implementation manner of the fourth aspect, in a fifth possible implementation manner, the first record event received by the receiving unit further includes the location information of the second target.

According to a fifth aspect, an embodiment of the present disclosure provides a system for screening AR content, including: the terminal according to the third aspect, and the server according to the fourth aspect.

The embodiments of the present disclosure provide a method, an apparatus, and a system for screening AR content, which can dynamically select, in real time according to a behavior selected by a user, augmented reality content that can most meet a requirement of the user, thereby meeting an information requirement of the user.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure.

The term "and/or" in this specification describes only an association relationship for describing associated objects and represents that three relationships may exist. For example, A and/or B may represent the following three cases of only A exists, both A and B exist, and only B exists. In addition, the character "/" in this specification generally indicates an "or" relationship between the associated objects.

Various technologies described in this specification may be applied to various wireless communications systems, for example, current $2^{nd}$ Generation (2G) and $3^{rd}$ Generation (3G) communications systems and a next-generation communications system, such as a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an orthogonal frequency division multiple access (OFDMA) system, a single carrier frequency division multiple access (SC-FDMA) system, a general packet radio service (GPRS) system, a Long Term Evolution (LTE) system, and other communications systems of this type.

A terminal may be a wireless terminal, and the wireless terminal may be an electronic device with a camera, a gyroscope, an electronic compass, a near field communication (NFC) module (optional), a central processing unit (CPU), a random access memory, a non-volatile memory and a communications module. The wireless terminal may communicate with one or more core networks using a radio access network (RAN). The wireless terminal may be a mobile terminal, such as a mobile phone (also referred to as a "cellular" phone) and a computer with a mobile terminal, for example, may be a portable, pocket-sized, handheld, or computer built-in mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile, a remote station, an access point, a remote terminal, an access terminal, a user agent, or user equipment.

Embodiment 1

Figure 1:
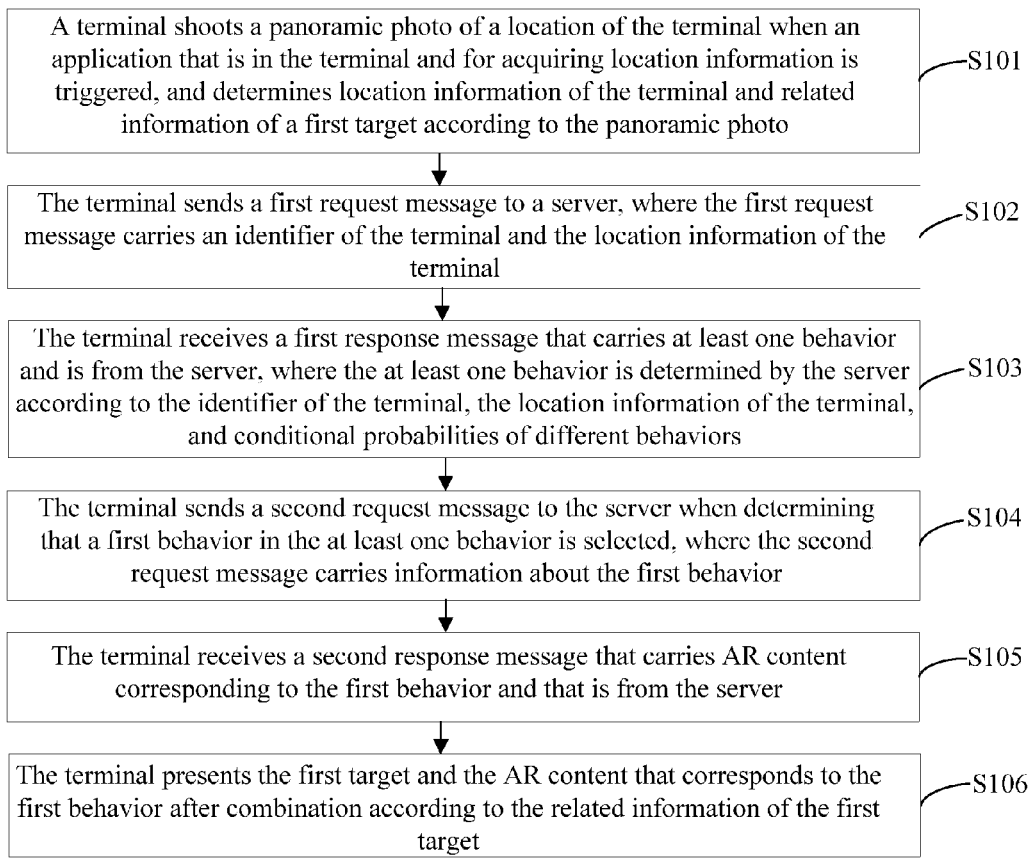
FIG. 1 is a flowchart 1 of a method for screening AR content according to an embodiment of the present disclosure.

As shown in FIG. 1, this embodiment of the present disclosure provides a method for screening AR content, which involves a terminal side, and the method may include:

S101: A terminal shoots a panoramic photo of a location of the terminal when an application that is in the terminal and for acquiring location information is triggered, and determines location information of the terminal and related information of a first target according to the panoramic photo.

In the method for screening AR content provided in this embodiment of the present disclosure, when a user loses the way in an indoor environment or cannot determine a behavior of the user, the user may trigger an application that is in a terminal and for acquiring location information. That is, when the application that is in the terminal and for acquiring location information is triggered by the user, the terminal may shoot a panoramic photo of a location of the terminal, and determine location information of the terminal and related information of a first target according to the panoramic photo. A technology for the terminal to determine the related information of the first target according to the panoramic photo shot by the terminal may include an optical character identification technology, an image identification technology, and the like.

Exemplarily, the first target refers to an object that exists in an indoor environment in which the terminal is located and that can be identified using an image processing method, that is, an AR target. In addition, the server stores a preset library of targets, where the library of targets stores multiple targets in the environment. The library of targets may also be downloaded from the server to the terminal in advance and stored by the terminal. For example, the first target may be one of objects such as a direction indication arrow, a store symbol, a fire symbol, or an elevator in the indoor environment in which the terminal is located.

Particularly, the related information of the first target may include an image characteristic value of the first target, location information of the first target, and the like. The related information of the first target may be data collected by the terminal in advance before S101.

Further, the terminal may also determine the location information of the terminal and the related information of the first target in another manner in which the environment in which the terminal is located can be displayed, which is not limited in the present disclosure.

S102: The terminal sends a first request message to a server, where the first request message carries an identifier of the terminal and the location information of the terminal.

After the terminal determines the location information of the terminal, the terminal sends the first request message to the server, where the first request message carries the identifier of the terminal and the location information of the terminal.

The identifier of the terminal may be a subscriber identity module (SIM) number of the terminal, or may be another identifier that meets a requirement, such as an international mobile equipment identity (IMEI) of the terminal, which is not limited in the present disclosure.

S103: The terminal receives a first response message that carries at least one behavior and is from the server, where the at least one behavior is determined by the server according to the identifier of the terminal, the location information of the terminal, and conditional probabilities of different behaviors.

In this embodiment of the present disclosure, the conditional probabilities of the different behaviors may be probabilities of occurrence of the different behaviors under a condition of occurrence of some behaviors.

After the terminal sends the first request message to the server, the first request message triggers the server to determine the at least one behavior according to the identifier of the terminal and the location information of the terminal that are carried in the first request message, the conditional probabilities of the different behaviors that are previously obtained through statistics collection and calculation by the server, and a preset probability threshold, and adds the at least one behavior to a first response message, and sends the first response message to the terminal, that is, the terminal receives the first response message that carries the at least one behavior and is from the server.

It may be understood that, the at least one behavior obtained by the server may be an event set, where the event set may be obtained by a program developer by initializing some daily behaviors of most users (for example, a user looks for a bank, a restaurant, a supermarket, or the like). In the method for screening AR content according to this embodiment of the present disclosure, the server may further collect and analyze a requirement of a user who uses the terminal, to extend the event set.

S104: The terminal sends a second request message to the server when determining that a first behavior in the at least one behavior is selected, where the second request message carries information about the first behavior.

After the terminal receives the at least one behavior sent by the server, the terminal presents the at least one behavior to the user, and the user may select, in the at least one behavior according to a requirement of the user, a behavior meeting the requirement of the user, that is, the first behavior. When the terminal determines that the first behavior in the at least one behavior is selected, the terminal may send the second request message to the server, where the second request message carries the information about the first behavior.

S105: The terminal receives a second response message that carries AR content corresponding to the first behavior and that is from the server.

After the server receives the second request message sent by the terminal, the server may select, according to the information that is about the first behavior and carried in the second request message, the AR content corresponding to the first behavior from AR content pre-stored by the server, add the AR content to a second response message, and send the second response message to the terminal, that is, the terminal receives the second response message that carries the AR content corresponding to the first behavior and that is from the server.

Exemplarily, the AR content may include image-text information, audiovisual information, a three-dimensional (3D) image, and the like. The AR content in this embodiment of the present disclosure may include one piece of classification information (the classification information may be represented as image-text information, audiovisual information, a 3D image, or the like), and the classification information is used to indicate which behavior of the user the AR content is related to. For example, if a class of a set of AR content is a navigation class, the set of AR content may be used to indicate that the selected first behavior is that the user heads to a specific destination.

S106: The terminal presents the first target and the AR content that corresponds to the first behavior after combination according to the related information of the first target.

After the terminal receives the AR content that corresponds to the first behavior and is sent by the server, the terminal may present the first target and the AR content after combination according to the related information of the first target. For example, the terminal presents a significant marker determined from the panoramic photo shot by the terminal and AR content, which is pre-stored in the server, of the significant marker after combination, so that the user may acquire, according to a display result presented by the terminal, a route for reaching the significant marker, and further reach a location of the significant marker.

It should be noted that, a manner of presenting, by the terminal, the first target and the AR content that corresponds to the first behavior may be registration display or non-registration display. The registration display refers to that content generated by a computer and an object in the physical world are aligned and combined into a uniform scenario to be presented to a user; and the non-registration display refers to that content generated by a computer and an object in the physical world are not aligned, but are only simply superimposed to be presented to a user.

Figure 2:
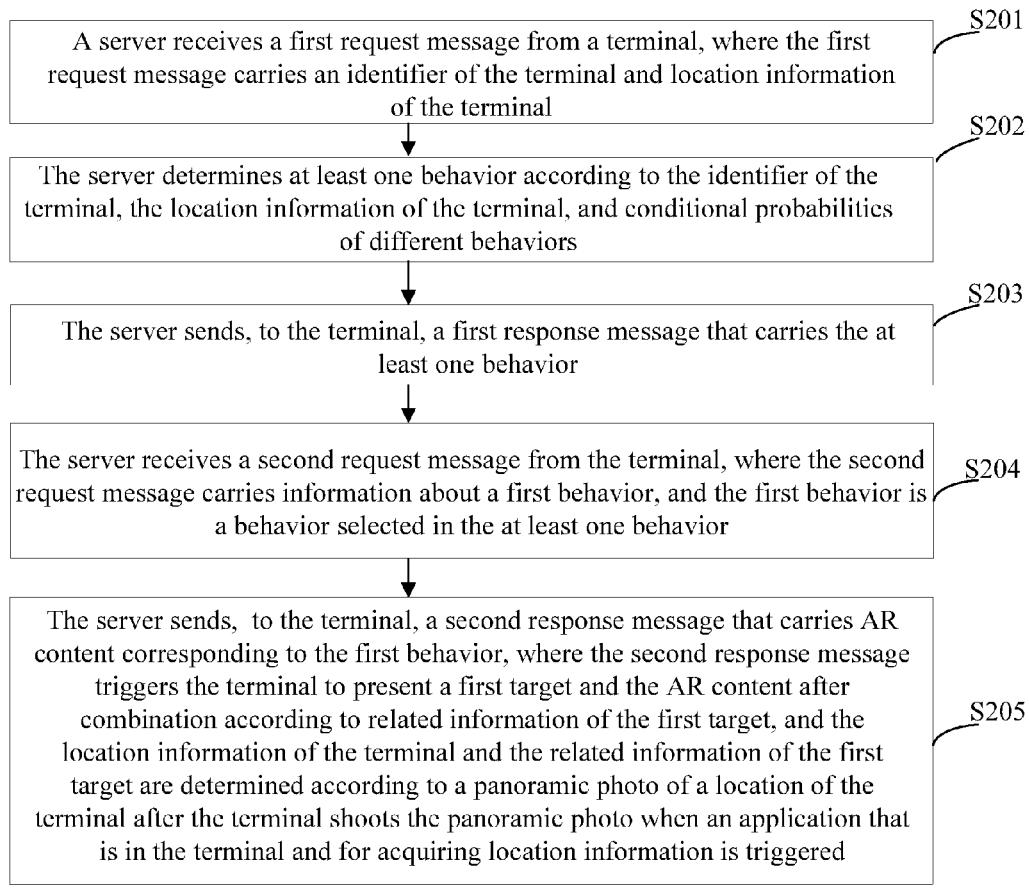
FIG. 2 is a flowchart 2 of a method for screening AR content according to an embodiment of the present disclosure.

As shown in FIG. 2, this embodiment of the present disclosure further provides a method for screening AR content, which involves a server side, and the method may include:

S201: A server receives a first request message from a terminal, where the first request message carries an identifier of the terminal and location information of the terminal.

When a user needs to acquire help information from the server, the user may trigger an application that is in the terminal and for acquiring location information. When the application that is in the terminal and for acquiring location information is triggered, the terminal may shoot a panoramic photo of a location of the terminal, and send a first request message to the server after determining the location information of the terminal and related information of a first target according to the panoramic photo, that is, the server receives the first request message sent by the terminal, where the first request message carries the identifier of the terminal and the location information of the terminal.

S202: The server determines at least one behavior according to the identifier of the terminal, the location information of the terminal, and conditional probabilities of different behaviors.

After the server receives the first request message sent by the terminal, the server may determine the at least one behavior according to the identifier of the terminal and the location information of the terminal that are carried in the first request message, the conditional probabilities of the different behaviors that are previously obtained through statistics collection and calculation by the server, and a preset probability threshold.

S203: The server sends, to the terminal, a first response message that carries the at least one behavior.

After the server obtains the at least one behavior, the server adds the at least one behavior to a first response message and sends the first response message to the terminal.

S204: The server receives a second request message from the terminal, where the second request message carries information about a first behavior, and the first behavior is a behavior selected in the at least one behavior.

After the server sends the first response message to the terminal, the terminal may present, to the user, the at least one behavior carried in the first response message, so that the user may select the first behavior in the at least one behavior according to a requirement of the user, and when the terminal determines that the first behavior in the at least one behavior is selected, the terminal sends the second request message to the server, that is, the server receives the second request message sent by the terminal, where the second request message carries the information about the first behavior.

S205: The server sends, to the terminal, a second response message that carries AR content corresponding to the first behavior, where the second response message triggers the terminal to present a first target and the AR content that corresponds to the first behavior after combination according to related information of the first target, and the location information of the terminal and the related information of the first target are determined according to a panoramic photo of a location of the terminal after the terminal shoots the panoramic photo when an application that is in the terminal and for acquiring location information is triggered.

After the server receives the second request message sent by the terminal, the server may select, according to the information that is about the first behavior and carried in the second request message, the AR content corresponding to the first behavior from AR content pre-stored in the server, add the AR content to a second response message, and send the second response message to the terminal, so that the second response message may trigger the terminal to present the first target and the AR content that corresponds to the first behavior to the user after combination according to the related information of the first target, so that the user may reach, according to an indication of a display result of the terminal, a destination required by the user, where the location information of the terminal and the related information of the first target are determined according to the panoramic photo of the location of the terminal after the terminal shoots the panoramic photo when the application that is in the terminal and for acquiring location information is triggered.

This embodiment of the present disclosure provides a method for screening AR content, which can dynamically select, in real time according to a behavior selected by a user, augmented reality content that can most meet a requirement of the user, thereby meeting an information requirement of the user.

Embodiment 2

Figure 3A:
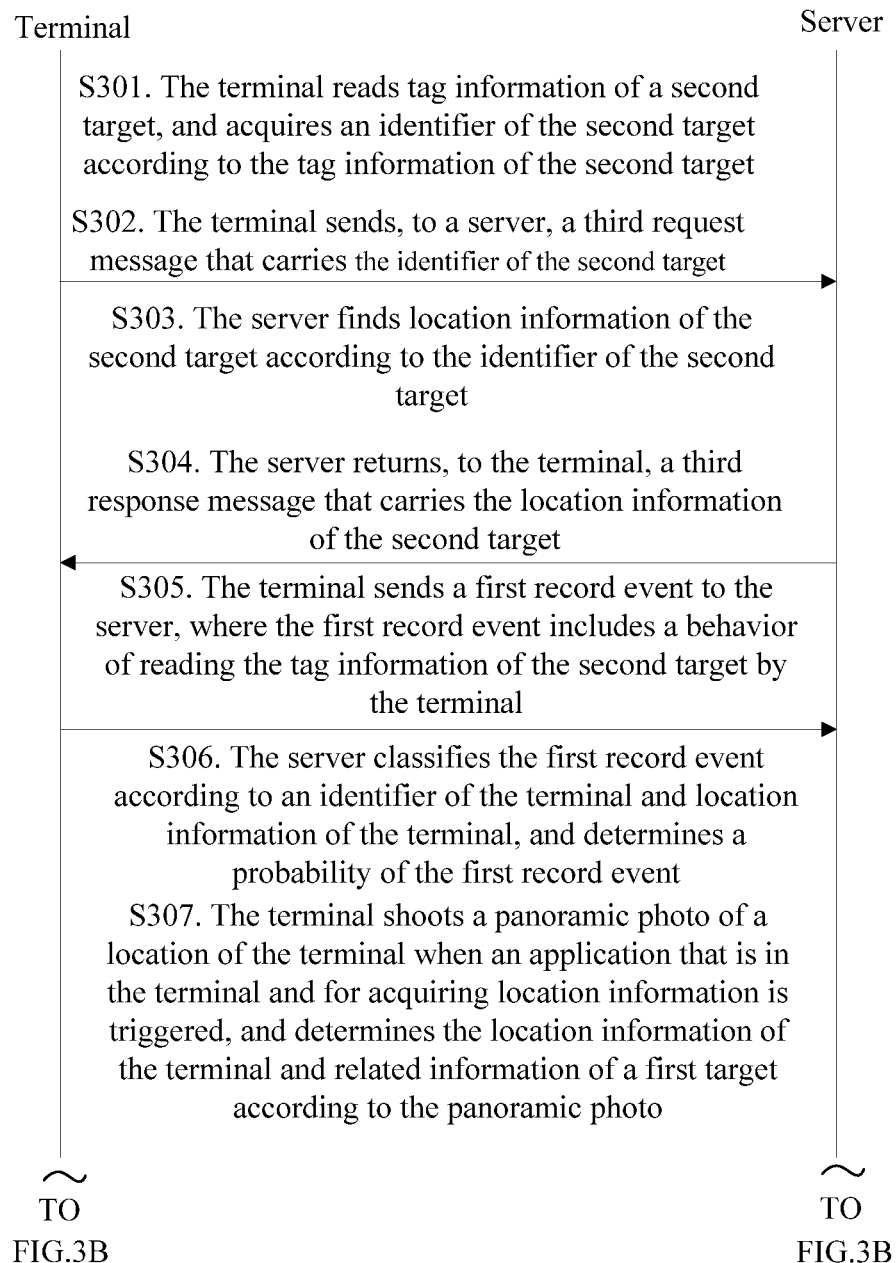
FIG. 3A and FIG. 3B are a flowchart 3 of a method for screening AR content according to an embodiment of the present disclosure.
Figure 3B:
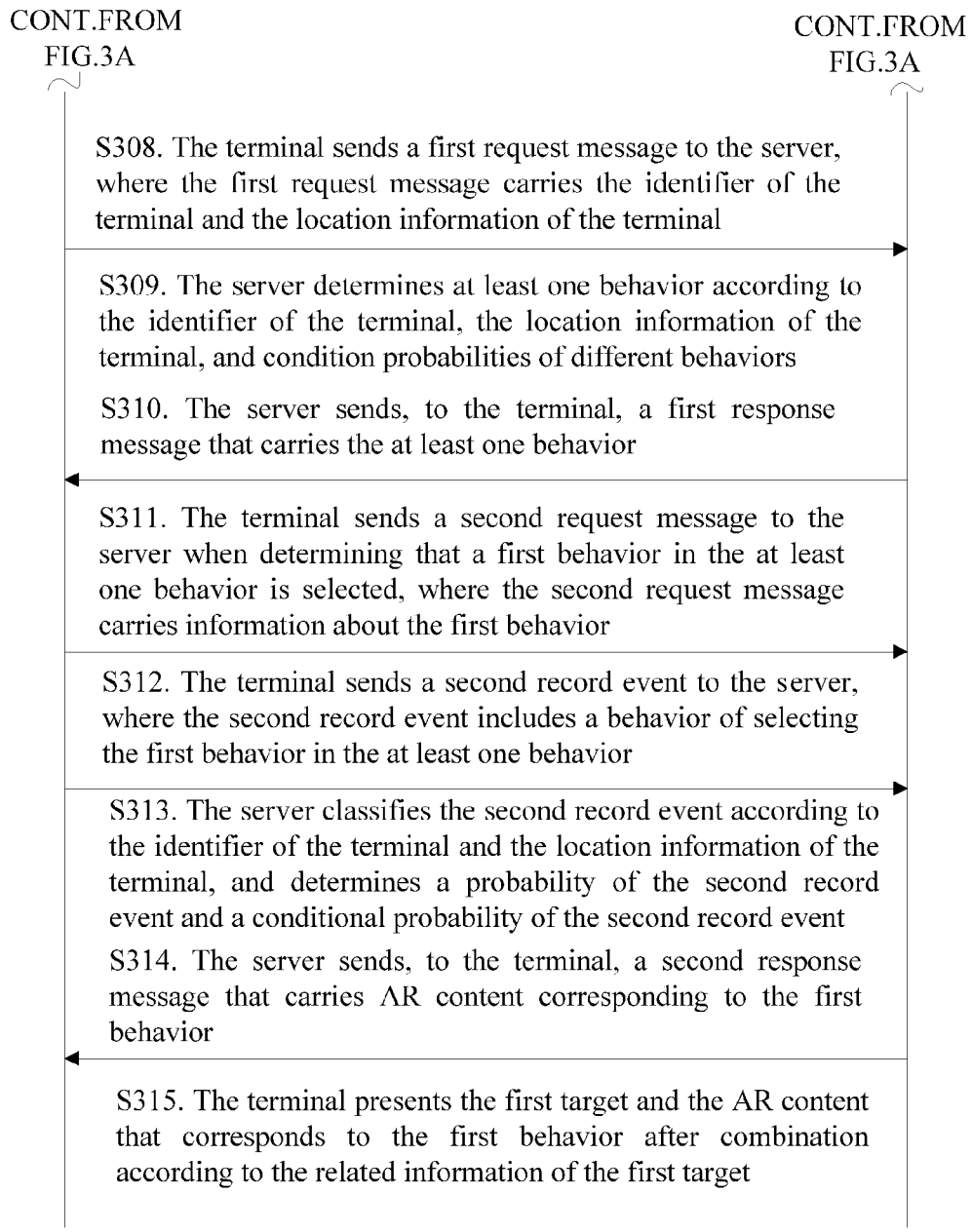

As shown in FIG. 3A and FIG. 3B, this embodiment of the present disclosure provides a method for screening AR content, and the method may include:

S301: A terminal reads tag information of a second target, and acquires an identifier of the second target according to the tag information of the second target.

When a user needs to learn information about an article or a product, the user may first read, using a terminal, tag information of a second target in a manner such as tag shooting, scanning, or reading, and acquire an identifier of the second target according to the tag information of the second target, where the second target is an article that is in an environment in which the terminal is located and that is provided with a readable tag.

S302: The terminal sends, to a server, a third request message that carries the identifier of the second target.

After the terminal acquires the identifier of the second target, the terminal may add the identifier of the second target to a third request message and send the third request message to the server. The identifier of the second target may include at least one of a name of the second target, a type of the second target, or a brand of the second target.

S303: The server finds location information of the second target according to the identifier of the second target.

After the server receives the identifier, from the terminal, of the second target, the server may find, according to the identifier of the second target, the location information of the second target in information pre-stored in the server. The location information of the second target may include coordinate values of the second target.

It should be noted that, the location information of the second target may be obtained using an indoor map collected in advance and data about the second target. A large quantity of articles with readable tags exist in public places such as a shopping center, a supermarket, a library, a museum, an airport, and a station, and as NFC tag costs decrease, NFC smart posters are widely applied; therefore, readable tags may be increasingly plentiful in public places. To facilitate management for items such as commodities or books, when sorting the items, a worker in a place such as a shopping mall or a library needs to record an area or a location of the items. Currently, an indoor map is uploaded to a map application service provider by the worker in the place generally. Therefore, when tidying and arranging an indoor environment, the worker may record location information of an article with a readable tag, that is, the second target, on the indoor map and store the location information to a server, which is an implementation manner for collecting the indoor map and the data about the second target.

There is also another method for collecting the location information of the second target. In an indoor environment such as a shopping center or a library, a user may use a mobile phone of the user, a headset device, or another mobile device to read a readable tag, such as a bar code, a two-dimensional code or an NFC tag, of the second target, and acquire a serial number of the second target, and request related information of the second target from a server. Moreover, an application including an indoor map of an environment in which the user is located may be provided, to encourage, in a rewarding manner, the user to mark scanned location information of the second target on the indoor map, so that the location information of the second target is stored in the server. This manner can not only collect the location information of the second target, but also correct the collected location information of the second target.

Optionally, the server may further find, according to the identifier of the second target, description information of the second target in the information pre-stored in the server, to provide the user with related information such as a material of the second target, a production place of the second target, a price of the second target, and comments of other users on the second target. The description information of the second target may be used to help the user to learn related information of a product viewed by the user.

In an indoor environment in which the terminal provided in this embodiment of the present disclosure is located, a large quantity of readable tags or information devices that may interact with the terminal exist, and locations of the readable tags and the information devices have been marked on the indoor map and stored in the server.

S304: The server returns, to the terminal, a third response message that carries the location information of the second target.

After the server finds the location information of the second target, the server may add the location information of the second target to a third response message and send the third response message to the terminal, that is, the terminal acquires the location information of the second target.

S305: The terminal sends a first record event to the server, where the first record event includes a behavior of reading the tag information of the second target by the terminal.

After the terminal reads the tag information of the second target, the terminal sends the first record event to the server, where the first record event may include the behavior of reading the tag information of the second target by the terminal.

When the terminal reads the tag information of the second target or exchanges information with the second target, the terminal automatically records the event (that is, the first record event), and sends the first record event to the server, and the first record event triggers the server to store and analyze the first record event, where the first record event may include a behavior of the terminal (for example, the terminal reads the tag information of the second target, or the terminal exchanges information with the second target).

Further, the first record event may further include the location information of the second target. After the terminal receives the location information, from the server, of the second target, the terminal uses the behavior of reading the tag information of the second target by the terminal and the location information of the second target as the first record event and sends the first record event to the server. In this case, the first record event may include the behavior of the terminal and a location at which the behavior of the terminal occurs, that is, the location information of the second target. Herein, because the terminal reads the second target, the location information of the second target is the same as location information of the terminal at this moment.

It may be understood that, when the terminal sends the first record event to the server, the server may acquire the location information of the terminal according to an identifier of the terminal.

It should be noted that, if the first record event sent by the terminal to the server does not include the location information of the second target, a sequence for performing S302 to S304 and S305 is not limited in the present disclosure, that is, in the present disclosure, S302 to S304 may be first performed and then S305 is performed; or S305 may be first performed and then S302 to S304 are performed; or S302 to S304 and S305 may be performed simultaneously.

S306: The server classifies the first record event according to an identifier of the terminal and location information of the terminal, and determines a probability of the first record event.

After the server receives the identifier of the terminal, the location information of the terminal, and the first record event that are sent by the terminal, the server may classify the first record event according to the identifier of the terminal and the location information of the terminal, and calculate a probability of occurrence of each class of first record event according to a law of large numbers, where the law of large numbers is a law describing a probabilistic property presented when testing is performed for a large quantity of times.

The identifier of the terminal may be a SIM number of the terminal, or may be another identifier that meets a requirement, such as an IMEI of the terminal, which is not limited in the present disclosure. The location information of the terminal may include coordinate values of the terminal.

For example, when a user exchanges a two-dimensional code for a movie ticket from a ticket vending machine in a cinema, a user buys a movie ticket at a ticket office on site by means of mobile payment, or a user buys popcorn and uses an NFC mobile payment function to make payment at a member service center, a terminal records such an event as a first record event and sends the first record event to a server, and after receiving the first record event sent by the terminal, the server classifies the first record event according to an identifier of the ticket vending machine/ticket office/member service center, or location information of the ticket vending machine/ticket office/member service center, or an identifier of the ticket vending machine/ticket office/member service center and location information of the ticket vending machine/ticket office/member service center. For another example, when a user exchanges a two-dimensional code for a movie ticket, the user may exchanges for the movie ticket using a movie ticket exchange terminal or an official cinema ticket vending machine, and such first record events of exchanging for a movie ticket using different exchange terminals may be classified by the server to a same class of first record event. After the server records a large quantity of first record events, the server may calculate a probability of occurrence of each class of first record event according to the law of large numbers. In the foregoing example of exchanging for a movie ticket, the server may calculate, according to behaviors having occurred on the terminal, a probability of buying a movie ticket at a ticket office on site by means of mobile payment and a probability of exchanging a two-dimensional code for a movie ticket from a ticket vending machine after the user enters a cinema.

In this embodiment of the present disclosure, the probability of occurrence of the first record event may be represented as a probability that the first record event occurs at a location of the second target.

It should be noted that, the terminal and the server may perform S301 to S306 repeatedly, to record more events and store a large quantity of data. For example, when the user goes to a shopping mall, the user may use the terminal to read tag information of multiple second targets, record the behaviors of reading the tag information of the second targets as first record events, and send the first record events to the server.

S307: The terminal shoots a panoramic photo of a location of the terminal when an application that is in the terminal and for acquiring location information is triggered, and determines the location information of the terminal and related information of a first target according to the panoramic photo.

When the user loses the way in an indoor environment or cannot determine a behavior of the user, the user may trigger the application that is in the terminal and for acquiring location information. That is, when the application that is in the terminal and for acquiring location information is triggered by the user, the terminal may shoot the panoramic photo of the location of the terminal, and determine the location information of the terminal and the related information of the first target according to the panoramic photo. A technology for the terminal to determine the related information of the first target according to the panoramic photo shot by the terminal may include an optical character identification technology, an image identification technology, and the like.

Exemplarily, the first target refers to an object that exists in an indoor environment in which the terminal is located and that can be identified using an image processing method, that is, an AR target. In addition, the server stores a preset library of targets, where the library of targets stores multiple targets in the environment. The library of targets may also be downloaded from the server to the terminal in advance and stored by the terminal. For example, the first target may be one of objects such as a direction indication arrow, a store symbol, a fire symbol, or an elevator in the indoor environment in which the terminal is located. The AR content may include image-text information, audiovisual information, a 3D image, and the like. The AR content in this embodiment of the present disclosure may include one piece of classification information (the classification information may be represented as image-text information, audiovisual information, a 3D image, or the like), and the classification information is used to indicate which behavior of the user the AR content is related to. For example, if a class of a set of AR content is a navigation class, the set of AR content may be used to indicate that the selected first behavior is that the user heads to a specific destination.

Particularly, the related information of the first target may include an image characteristic value of the first target, location information of the first target, and the like. The related information of the first target may be data collected by the terminal in advance before S307; and the location information of the first target may include coordinate values of the first target.

A method of determining, by the terminal, the location information of the first target may be one of the following:

(1) After the terminal shoots the panoramic photo of the location of the terminal, the terminal performs image processing on the panoramic photo, and compares a characteristic value of an object extracted in the panoramic photo with a characteristic value of a first target in a preset library, stored by the terminal, of first targets, and if the library of first targets has an object whose characteristic value is the same as that of the object in the panoramic photo, the terminal may determine that the first target is found in the panoramic photo, and may further determine location information of the first target as the location information of the first target is associated with an image feature of the first target.

(2) The terminal shoots the panoramic photo, and determines a location of the terminal according to an indoor positioning algorithm based on vision, so that the terminal searches for identifiable first targets that may exist near the location of the terminal, and further acquires location information of the first targets according to the first targets as the location information of the first targets is preset and pre-stored in the terminal.

It should be noted that, in the method for screening AR content according to this embodiment of the present disclosure, the server stores a preset library of first targets, or the library of first targets may be downloaded to the terminal in advance. A first target and its related image characteristic value, location information, and the like are collected in advance intentionally, and the data may be collected before application deployment.

Further, the terminal may also determine the location information of the terminal and the related information of the first target in another manner in which the environment in which the terminal is located can be displayed, which is not limited in the present disclosure.

S308: The terminal sends a first request message to the server, where the first request message carries the identifier of the terminal and the location information of the terminal.

After the terminal determines the location information of the terminal, the terminal sends the first request message to the server, where the first request message carries the identifier of the terminal and the location information of the terminal.

S309: The server determines at least one behavior according to the identifier of the terminal, the location information of the terminal, and conditional probabilities of different behaviors.

After the server receives the first request message sent by the terminal, the server may determine the at least one behavior according to the identifier of the terminal and the location information of the terminal that are carried in the first request message, the conditional probabilities of the different behaviors that are previously obtained through statistics collection and calculation by the server, and a preset probability threshold.

It may be understood that, the at least one behavior obtained by the server may be an event set, where the event set may be obtained by a program developer by initializing some daily behaviors of most users (for example, a user looks for a bank, a restaurant, a supermarket, or the like). In the method for screening AR content according to this embodiment of the present disclosure, the server may further collect and analyze a requirement of a user who uses the terminal, to extend the event set. Conditional probabilities of specific different behaviors are described in detail subsequently.

S310: The server sends, to the terminal, a first response message that carries the at least one behavior.

After the server obtains the at least one behavior, the server adds the at least one behavior to a first response message and sends the first response message to the terminal.

S311: The terminal sends a second request message to the server when determining that a first behavior in the at least one behavior is selected, where the second request message carries information about the first behavior.

After the terminal receives the at least one behavior sent by the server, the terminal presents the at least one behavior to the user, and the user may select, in the at least one behavior according to a requirement of the user, a behavior meeting the requirement of the user, that is, the first behavior. When the terminal determines that the first behavior in the at least one behavior is selected, the terminal may send the second request message to the server, where the second request message carries the information about the first behavior.

A person of ordinary skill in the art may understand that, the at least one behavior or the first behavior presented on the terminal is displayed in a form of an anchor text. The anchor text refers to a text with a uniform resource locator (URL) link, that is, when a user clicks or touches a text, access to a URL link may be triggered.

S312: The terminal sends a second record event to the server, where the second record event includes a behavior of selecting the first behavior in the at least one behavior.

When the terminal determines that the first behavior in the at least one behavior is selected, the terminal sends the second record event to the server, where the second record event includes the behavior of selecting the first behavior in the at least one behavior.

Optionally, the related information of the first target includes the location information of the first target, where the second record event further includes the location information of the first target. After the terminal acquires the location information of the first target, the terminal uses the behavior of selecting the first behavior in the at least one behavior and the location information of the first target as the second record event and sends the second record event to the server. In this case, the second record event may include the behavior of selecting the first behavior in the at least one behavior and the location information, which is determined by the terminal from the panoramic photo, of the first target.

It should be noted that, a sequence for performing S311 and S312 is not limited in the present disclosure, that is, in the present disclosure, S311 may be first performed and then S312 is performed, or S312 may be first performed and then S311 is performed, or S311 and S312 may be performed simultaneously.

S313: The server classifies the second record event according to the identifier of the terminal and the location information of the terminal, and determines a probability of the second record event and a conditional probability of the second record event.

After the server receives the second record event sent by the terminal, the server may classify the second record event according to the identifier of the terminal and the location information of the terminal, calculate a probability of each class of second record event according to a law of large numbers, and determine, according to the probability of the first record event and the probability of the second record event, the conditional probability of the second record event, that is, a probability of occurrence of the second record event under a condition of occurrence of the first record event. In the method for screening AR content according to this embodiment of the present disclosure, frequency of occurrence of the first record event may be recorded as the probability of the first record event; and frequency of occurrence of the second record event may be recorded as the probability of the second record event.

In this embodiment of the present disclosure, the conditional probability of the second record event may be a probability of occurrence of the second record event under a condition of occurrence of the first record event. Under a condition that the server has learned occurrence of the second record event, the server may further collect statistics on a probability of occurrence of the first record event under the condition, that is, the conditional probability of the first record event, and calculate the conditional probability of the second record event, that is, the probability of occurrence of the second record event under a condition of occurrence of the first record event, according to the conditional probability of the first record event, the probability of the first record event, and the probability of the second record event using a Bayes formula.

It may be understood that, for multiple classes of first record events and multiple classes of second record events, a probability of possible occurrence of each class of second record event under a condition of occurrence of each class of first record event, that is, the foregoing conditional probabilities of different behaviors, may be calculated.

Particularly, the following describes in detail a method and process for calculating the conditional probabilities of different behaviors.

The Bayes theorem is an important theorem in the probability theory, and a relationship between a posterior probability $P(A|B)$ and a prior probability $P(A)$ may be represented as:

$$P(A \mid B) = P(A)\frac{P(B \mid A)}{P(B)}$$

where an event B is an observed event, and an event A is an event that may cause occurrence of the event B. Under a condition of occurrence of the event A, assuming that a subsequent event that may occur is $B = U_{j=1}^{k} B_j$, and a probability of each $B_j$ in an event set $B_j$ ($j=1, 2, \ldots k$) is $P(B_j)$, it may be obtained according to the Bayes theorem that a probability of occurrence of any event $B_j$ under a condition of occurrence of the given event A, that is, a conditional probability of the event $B_j$, is as follows:

$$P(B_j \mid A) = P(B_j)\frac{P(A \mid B_j)}{P(A)}$$

It can be seen from the foregoing formula that, according to the Bayes theorem, if probabilities of occurrence of the event A and event B and a probability of occurrence of the event A when the event B occurs are known, the condition probability of occurrence of the event B under a condition of occurrence of the event A may be calculated.

Assuming that a set of first record events stored by the server is $\{A_i, i=1, 2, \ldots, N\}$, where $A_i$ represents an $i^{th}$ class of first record event, and a union set of N classes of first record events is $U_{i=1}^{N} A_i = \Omega$, the server may calculate a probability $P(A_i)$ of occurrence of the $i^{th}$ class of first record event; then, assuming that a set of second record events stored by the server is $\{B_j, j=1, 2, \ldots, M\}$, where $B_j$ represents a $j^{th}$ class of second record event, and a union set of M classes of second record events is $U_{j=1}^{M} B_j = \Omega$, the server may calculate a probability $P(B_j)$ of occurrence of the $j^{th}$ class of second record event; and when a quantity of second record events received by the server is not enough, it may be assumed that the second record event $B_j$ is an equal probability event.

The server performs statistics collection according to a terminal identifier, and may obtain a sample that a terminal performs the second record event $B_j$ after performing the first record event $A_i$, so as to obtain, from enough samples through calculation, that a probability of occurrence of the first record event $A_i$ under a condition of occurrence of the second record event $B_j$ is $P(A_i|B_j)$.

According to the Bayes theorem, it may be obtained through calculation that a conditional probability of occurrence of the second record event $B_j$ under a condition of occurrence of the first record event $A_i$ is:

$$P(B_j \mid A_i) = \frac{P(B_i)P(A_i \mid B_j)}{P(A_i)}$$

Further, if before a same terminal sends a request message to the server, first record events that are stored by the server and reported by the terminal are $A_1$ and $A_2$, assuming that a behavior of selecting a piece of help information by a user using the terminal, that is, the second record event $B_j$, is recorded as an event $E_1$, and a behavior of skipping selecting a piece of help information by the user is recorded as event $E_2$, as shown in Table 1:

TABLE 1

| Event | $A_1$ | $A_2$ | $B_j$ |
|---|---|---|---|
| $E_1$ | $A_1$ occurs | $A_2$ occurs | $B_j$ occurs |
| $E_2$ | $A_1$ occurs but $B_j$ does not occur | $A_2$ occurs but $B_j$ does not occur | $B_j$ does not occur |

It can be seen from Table 1 that, $E_1$ represents that $B_j$ occurs after $A_1$ and $A_2$ occur; and $E_2$ represents that $B_j$ does not occur after $A_1$ and $A_2$ occur. Assuming that $A_1$ and $A_2$ are independent events, Table 2 may be obtained:

TABLE 2

| Event | $A_1$ | $A_2$ | $B_j$ |
|---|---|---|---|
| $E_1$ | $P(B_j \mid A_1)$ | $P(B_j \mid A_2)$ | $P(B_j)$ |
| $E_2$ | $1-P(B_j \mid A_1)$ | $1-P(B_j \mid A_2)$ | $1-P(B_j)$ |

In conclusion, after $A_1$ and $A_2$ occur, a probability of occurrence of $B_j$ may be calculated using the following formula:

$$P = \frac{P(E_1)}{P(E_1) + P(E_2)} = \frac{P(B_j \mid A_1)P(B_j \mid A_2)P(B_j)}{P(B_j \mid A_1)P(B_j \mid A_2)P(B_j) + (1 - P(B_j \mid A_1))(1 - P(B_j \mid A_2))(1 - P(B_j))}$$

Therefore, a probability P of a behavior $B_j$ that a user hopes to obtain a piece of help information after it is recorded in succession that the user performs the two events $A_1$ and $A_2$ using a terminal, that is, conditional probabilities of different behaviors, may be calculated, so that the server may obtain, according to a maximum conditional probability in the conditional probabilities of the different behaviors, at least one behavior, which most likely occurs, of the user. The server sends the at least one behavior obtained by the server to the terminal, so that the terminal may present the at least one behavior to the user, and the user selects a behavior required by the user, and further acquires help information according to the behavior.

S314: The server sends, to the terminal, a second response message that carries AR content corresponding to the first behavior.

After the server receives the second request message sent by the terminal, the server may select, according to the information that is about the first behavior and carried in the second request message, the AR content corresponding to the first behavior from AR content pre-stored in the server, add the AR content to a second response message, and send the second response message to the terminal.

S315: The terminal presents the first target and the AR content that corresponds to the first behavior after combination according to the related information of the first target.

After the terminal receives the AR content that corresponds to the first behavior and is sent by the server, the terminal may present the first target and the AR content after combination according to the related information of the first target. For example, the terminal presents a significant marker determined from the panoramic photo shot by the terminal and AR content, which is pre-stored in the server, of the significant marker after combination, so that the user may acquire, according to a display result presented by the terminal, a route for reaching the significant marker, and further reach a location of the significant marker.

It should be noted that, a manner of presenting, by the terminal, the first target and the AR content that corresponds to the first behavior may be registration display or non-registration display. The registration display refers to that content generated by a computer and an object in the physical world are aligned and combined into a uniform scenario to be presented to a user; and the non-registration display refers to that content generated by a computer and an object in the physical world are not aligned, but are only simply superimposed to be presented to a user. When the second record event sent by the terminal to the server includes the location information of the first target, the terminal displays the AR content corresponding to the combination of the first behavior and the first target in a manner of registration display. On the contrary, when the second record event sent by the terminal to the server does not include the location information of the first target, the terminal displays the AR content corresponding to the combination of the first behavior and the first target in a manner of non-registration display.

This embodiment of the present disclosure provides a method for screening AR content, which can dynamically select, in real time according to a behavior selected by a user, augmented reality content that can most meet a requirement of the user, thereby meeting an information requirement of the user.

Embodiment 3

Figure 4:
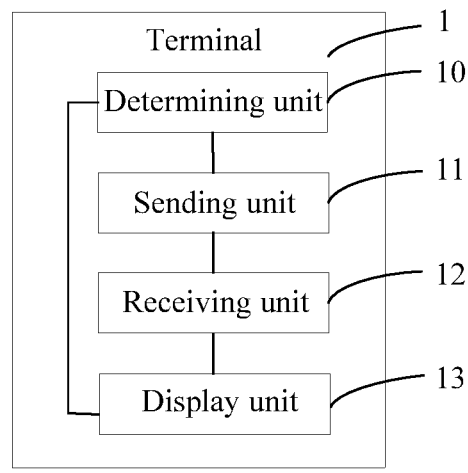
FIG. 4 is a schematic structural diagram 1 of a terminal according to an embodiment of the present disclosure.

As shown in FIG. 4, this embodiment of the present disclosure provides a terminal 1, including a determining unit 10 configured to shoot a panoramic photo of a location of the terminal when an application that is in the terminal and for acquiring location information is triggered, and determine location information of the terminal and related information of a first target according to the panoramic photo; a sending unit 11 configured to send a first request message to a server, where the first request message carries an identifier of the terminal and the location information, which is determined by the determining unit 10, of the terminal; a receiving unit 12 configured to receive a first response message that carries at least one behavior and is from the server, where the at least one behavior is determined by the server according to the identifier of the terminal, the location information of the terminal, and conditional probabilities of different behaviors, where the sending unit 11 is further configured to send a second request message to the server when the terminal determines that a first behavior in the at least one behavior is selected, where the second request message carries information about the first behavior; and the receiving unit 12 is further configured to receive a second response message that carries AR content corresponding to the first behavior and that is from the server; and a display unit 13 configured to present the first target and the AR content, which is received by the receiving unit 12, after combination according to the related information, which is determined by the determining unit 10, of the first target.

Optionally, before the determining unit 10 shoots the panoramic photo of the location of the terminal when the application that is in the terminal and for acquiring location information is triggered, and determines the location information of the terminal and the related information of the first target according to the panoramic photo, the determining unit 10 is further configured to read tag information of a second target; and the sending unit 11 is further configured to send a first record event to the server, where the first record event triggers the server to classify the first record event according to the identifier of the terminal and the location information of the terminal and determine a probability of the first record event, and the first record event includes a behavior of reading the tag information of the second target by the determining unit 10.

Optionally, after the sending unit 11 sends the second request message to the server, the sending unit 11 is further configured to send a second record event to the server, where the second record event triggers the server to classify the second record event according to the identifier of the terminal and the location information of the terminal and determine a probability of the second record event and a conditional probability of the second record event, and the second record event includes a behavior of selecting the first behavior in the at least one behavior.

Optionally, the related information, which is determined by the determining unit 10, of the first target includes location information of the first target, and the second record event sent by the sending unit 11 further includes the location information of the first target.

Optionally, after the determining unit 10 reads the tag information of the second target, the determining unit 10 is further configured to acquire an identifier of the second target according to the tag information of the second target; the sending unit 11 is further configured to send, to the server, a third request message that carries the identifier of the second target; and the receiving unit 12 is further configured to receive a third response message that carries location information of the second target and is returned by the server.

Optionally, the first record event sent by the sending unit 11 further includes the location information of the second target.

This embodiment of the present disclosure provides a terminal, which can dynamically select, in real time according to a behavior selected by a user, augmented reality content that can most meet a requirement of the user, thereby meeting an information requirement of the user.

Figure 5:
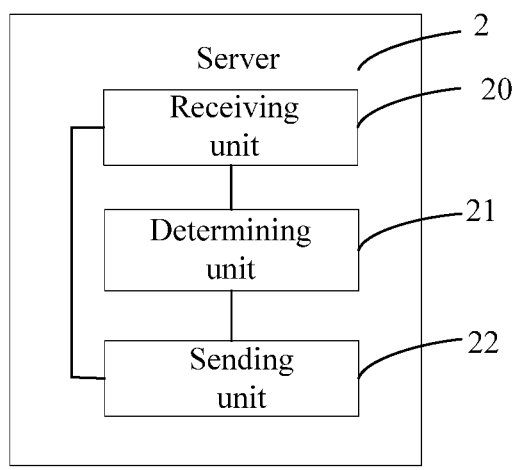
FIG. 5 is a schematic structural diagram 1 of a server according to an embodiment of the present disclosure.

As shown in FIG. 5, this embodiment of the present disclosure provides a server 2, including a receiving unit 20 configured to receive a first request message from a terminal, where the first request message carries an identifier of the terminal and location information of the terminal; a determining unit 21 configured to determine at least one behavior according to the identifier of the terminal and the location information of the terminal that are received by the receiving unit 20 and conditional probabilities of different behaviors; and a sending unit 22 configured to send, to the terminal, a first response message that carries the at least one behavior determined by the determining unit 21, where the receiving unit 20 is further configured to receive a second request message from the terminal, where the second request message carries information about a first behavior, and the first behavior is a behavior selected in the at least one behavior; and the sending unit 22 is further configured to send, to the terminal, a second response message that carries AR content corresponding to the first behavior, where the second response message triggers the terminal to present a first target and the AR content after combination according to related information of the first target, and the location information of the terminal and the related information of the first target are determined according to a panoramic photo of a location of the terminal after the terminal shoots the panoramic photo when an application that is in the terminal and for acquiring location information is triggered.

Optionally, before the receiving unit 20 receives the first request message from the terminal, the receiving unit 20 is further configured to receive a first record event from the terminal, where the first record event includes a behavior of reading tag information of a second target by the terminal; and the determining unit 21 is further configured to classify the first record event according to the identifier of the terminal and the location information of the terminal, and determine a probability of the first record event.

Optionally, after the receiving unit 20 receives the second request message from the terminal, the receiving unit 20 is further configured to receive a second record event from the terminal, where the second record event includes a behavior of selecting the first behavior in the at least one behavior; and the determining unit 21 is further configured to classify the second record event according to the identifier of the terminal and the location information of the terminal, and determine a probability of the second record event and a conditional probability of the second record event.

Optionally, the related information of the first target includes location information of the first target, and the second record event received by the receiving unit 20 further includes the location information of the first target.

Optionally, before the receiving unit 20 receives the first record event from the terminal, the receiving unit 20 is further configured to receive a third request message that carries an identifier of the second target and is from the terminal, where the identifier of the second target is acquired by the terminal according to the tag information of the second target; and the sending unit 22 is further configured to send, to the terminal, a third response message that carries location information of the second target.

Optionally, the first record event received by the receiving unit 20 further includes the location information of the second target.

This embodiment of the present disclosure provides a server, which can enable a terminal to dynamically select, in real time according to a behavior selected by a user, augmented reality content that can most meet a requirement of the user, thereby meeting an information requirement of the user.

Embodiment 4

Figure 6:
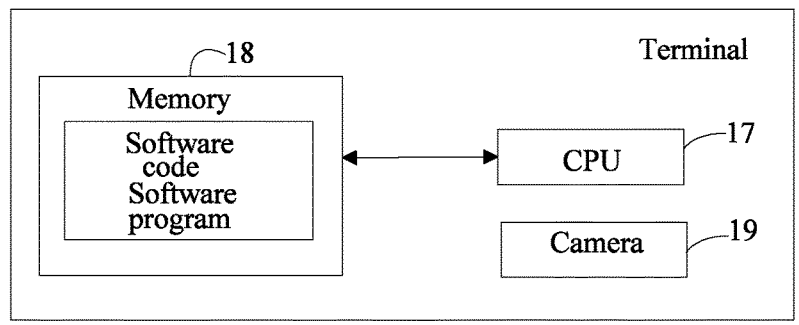
FIG. 6 is a schematic structural diagram 2 of a terminal according to an embodiment of the present disclosure.

As shown in FIG. 6, this embodiment of the present disclosure provides a terminal, including a CPU 17, a memory 18, and a camera 19, where the CPU 17 is a control and processing center of the terminal, and runs a software program stored in the memory 18, and invokes and processes data stored in the memory 18, so as to control the terminal to receive and send signals, and implement other functions of the terminal; the memory 18 may be configured to store the software program and data, so that the CPU 17 may run the software program stored in the memory 18, so as to implement signal receiving and sending functions and other functions of the terminal; and the camera 19 may be configured to shoot a photo after being triggered by the CPU 17.

The CPU 17 may at least perform the following steps: (1) the CPU 17 may be configured to trigger, when an application that is in the terminal and for acquiring location information is triggered, the camera 19 to shoot a panoramic photo of a location of the terminal, and determine location information of the terminal and related information of a first target according to the panoramic photo; (2) the CPU 17 may be further configured to send a first request message to a server, where the first request message carries an identifier of the terminal and the location information, which is determined by the CPU 17, of the terminal; (3) the CPU 17 may be further configured to receive a first response message that carries at least one behavior and is from the server, where the at least one behavior is determined by the server according to the identifier of the terminal, the location information of the terminal, and conditional probabilities of different behaviors; (4) the CPU 17 may be further configured to send a second request message to the server when the terminal determines that a first behavior in the at least one behavior is selected, where the second request message carries information about the first behavior; (5) the CPU 17 may be further configured to receive a second response message that carries AR content corresponding to the first behavior and that is from the server; and (6) the CPU 17 may be further configured to present the first target and the AR content after combination according to the related information of the first target, where the memory 18 may be configured to store software code of the application that is in the terminal and for acquiring location information, software code for shooting the panoramic photo, software code for determining the location information of the terminal and software code for determining the related information of the first target, software code for acquiring the identifier of the terminal, software code for displaying the at least one behavior, software code for determining the information about the first behavior, software code for displaying the AR content, and a software program for controlling the terminal to complete the foregoing process, so that the CPU 17 completes the foregoing process by executing the foregoing software program and invoking the foregoing software code.

In this embodiment of the present disclosure, the memory 18 may be a double data rate synchronous dynamic random access memory (DDR SDRAM), a static random access memory (SRAM), a flash memory, a solid state disk (SSD), a random access memory (RAM), a read-only memory (ROM), or the like, and mainly includes a program storage area and a data storage area, where the program storage area may store an operating system, an application program required by at least one function (for example, the foregoing software code), and the like; and the data storage area may store data finally generated according to an execution situation of the CPU 17. Intermediate data generated when the CPU 17 performs the foregoing steps is stored in an internal memory. It should be noted that, the CPU 17 and the memory 18 may be integrated in a same chip, or may be two independent components.

Optionally, before the CPU 17 shoots the panoramic photo of the location of the terminal when the application that is in the terminal and for acquiring location information is triggered, and determines the location information of the terminal and the related information of the first target according to the panoramic photo, the CPU 17 is further configured to read tag information of a second target, and send a first record event to the server, where the first record event triggers the server to classify the first record event according to the identifier of the terminal and the location information of the terminal and determine a probability of the first record event, and the first record event includes a behavior of reading the tag information of the second target by the CPU 17.

Optionally, after the CPU 17 sends the second request message to the server, the CPU 17 is further configured to send a second record event to the server, where the second record event triggers the server to classify the second record event according to the identifier of the terminal and the location information of the terminal and determine a probability of the second record event and a conditional probability of the second record event, and the second record event includes a behavior of selecting the first behavior in the at least one behavior.

Optionally, the related information, which is determined by the CPU 17, of the first target includes location information of the first target, and the second record event sent by the CPU 17 further includes the location information of the first target.

Optionally, after the CPU 17 reads the tag information of the second target, the CPU 17 is further configured to acquire an identifier of the second target according to the tag information of the second target, send, to the server, a third request message that carries the identifier of the second target, and receive a third response message that carries location information of the second target and is returned by the server.

Optionally, the first record event sent by the CPU 17 further includes the location information of the second target.

This embodiment of the present disclosure provides a terminal, which can dynamically select, in real time according to a behavior selected by a user, augmented reality content that can most meet a requirement of the user, thereby meeting an information requirement of the user.

Figure 7:
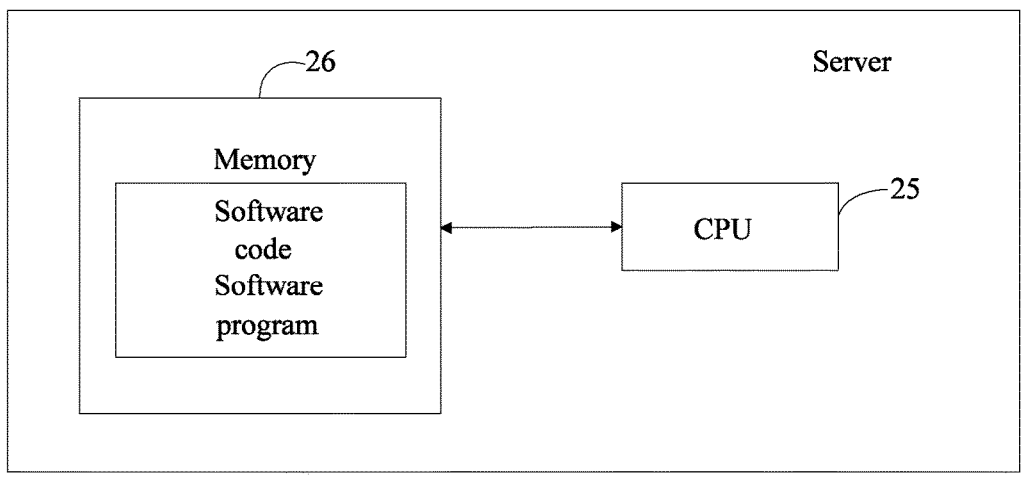
FIG. 7 is a schematic structural diagram 2 of a server according to an embodiment of the present disclosure.

As shown in FIG. 7, this embodiment of the present disclosure provides a server, including a CPU 25 and a memory 26, where the CPU 25 is a control and processing center of the server, and runs a software program stored in the memory 26, and invokes and processes data stored in the memory 26, so as to control the server to receive and send signals, and implement other functions of the server; and the memory 26 may be configured to store the software program and data, so that the CPU 25 may run the software program stored in the memory 26, so as to implement signal receiving and sending functions and other functions of the server.

The CPU 25 may at least perform the following steps: (1) the CPU 25 may be configured to receive a first request message from a terminal, where the first request message carries an identifier of the terminal and location information of the terminal; (2) the CPU 25 may be further configured to determine at least one behavior according to the identifier of the terminal, the location information of the terminal, and conditional probabilities of different behaviors; (3) the CPU 25 may be further configured to send, to the terminal, a first response message that carries the at least one behavior; (4) the CPU 25 may be further configured to receive a second request message from the terminal, where the second request message carries information about a first behavior, and the first behavior is a behavior selected in the at least one behavior; and (5) the CPU 25 may be further configured to send, to the terminal, a second response message that carries AR content corresponding to the first behavior, where the second response message triggers the terminal to present a first target and the AR content after combination according to related information of the first target, and the location information of the terminal and the related information of the first target are determined according to a panoramic photo of a location of the terminal after the terminal shoots the panoramic photo when an application that is in the terminal and for acquiring location information is triggered, where the memory 26 may be configured to store software code of the identifier of the terminal, software code for receiving the location information of the terminal, software code for calculating the conditional probabilities of the different behaviors and sending the at least one behavior, software code for receiving the information about the first behavior, software code for sending the AR content corresponding to the first behavior, and a software program for controlling the server to complete foregoing process, so that the CPU 25 may complete the foregoing process by executing the foregoing software program and invoking the foregoing software code.

In this embodiment of the present disclosure, the memory 26 may be a DDR SDRAM, an SRAM, a FLASH, an SSD, a RAM, a ROM, or the like, and mainly includes a program storage area and a data storage area, where the program storage area may store an operating system, an application program required by at least one function (for example, the foregoing software code), and the like; and the data storage area may store data finally generated according to an execution situation of the CPU 25. Intermediate data generated when the CPU 25 performs the foregoing steps is stored in an internal memory. It should be noted that, the CPU 25 and the memory 26 may be integrated in a same chip, or may be two independent components.

Optionally, before the CPU 25 receives the first request message from the terminal, the CPU 25 is further configured to receive a first record event from the terminal, and classify the first record event according to the identifier of the terminal and the location information of the terminal and determine a probability of the first record event, where the first record event includes a behavior of reading tag information of a second target by the terminal.

Optionally, after the CPU 25 receives the second request message from the terminal, the CPU 25 is further configured to receive a second record event from the terminal, and classify the second record event according to the identifier of the terminal and the location information of the terminal and determine a probability of the second record event and a conditional probability of the second record event, where the second record event includes a behavior of selecting the first behavior in the at least one behavior.

Optionally, the related information of the first target includes location information of the first target, and the second record event received by the CPU 25 further includes the location information of the first target.

Optionally, before the CPU 25 receives the first record event from the terminal, the CPU 25 is further configured to receive a third request message that carries an identifier of the second target and is from the terminal, and return, to the terminal, a third response message that carries location information of the second target, where the identifier of the second target is acquired by the terminal according to the tag information of the second target.

Optionally, the first record event received by the CPU 25 further includes the location information of the second target.

This embodiment of the present disclosure provides a server, which can enable a terminal to dynamically select, in real time according to a behavior selected by a user, augmented reality content that can most meet a requirement of the user, thereby meeting an information requirement of the user.

Embodiment 5

Figure 8:
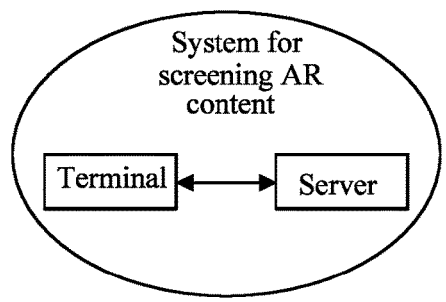
FIG. 8 is a block diagram of a system for screening AR content according to an embodiment of the present disclosure.

As shown in FIG. 8, this embodiment of the present disclosure provides a system for screening AR content, including the terminal and the server that are described in the foregoing Embodiment 1 to Embodiment 4.

To more exactly understand the implementation manners of the technical solutions of the present disclosure, corresponding to the method for screening AR content according to the embodiments of the present disclosure, the following uses a shopping center and a museum separately as examples to describe implementation scenarios of the method for screening AR content according to the embodiments of the present disclosure, that is, processes of screening content that needs to be enhanced to be displayed in the shopping center and the museum.

Implementation Scenario 1: Shopping Center:

When decoration, arrangement and items placement are performed in a shopping center, an indoor map of the shopping center and data about POIs in the shopping center are collected according to the method provided in the foregoing embodiments. After coming to the shopping center, first, a user enters a dress brand store X for women to pick out and buy a dress. An application for acquiring location information provided in the technical solutions of the present disclosure is installed in a terminal carried by the user, and the application can read a bar code or two-dimensional code of any commodity in the shopping center, and push, to the terminal, description information of a commodity related to the read commodity, for example, information such as a brand of the commodity, a material of the commodity, a number of the commodity, a price of the commodity, and an inventory of the commodity. Therefore, the user uses the terminal to query for description information of dresses in the dress brand store X for women while walking. Finally, the user picks out a dress, and asks a shop assistant to make out an invoice. The shop assistant registers the dress picked out by the user, and writes corresponding transaction information to the terminal carried by the user. When the terminal carried by the user acquires the transaction information, the terminal records the event of picking out the dress by the user and uploads the event to a server.

The user then comes to a gift store Y and a cosmetic store Z, and respectively picks out and buys a gift and a cosmetic in the two stores. A shop assistant also writes corresponding transaction information to the terminal carried by the user. Likewise, when the terminal carried by the user acquires the two pieces of transaction information, the terminal separately records the two events of picking out the gift and picking out the cosmetic by the user and uploads the events to the server. After walking out of the cosmetic store Z, the user finds a checkout counter closest to the cosmetic store Z to make payment, and after completing the payment, a worker at the checkout counter writes a payment voucher and an electronic invoice separately to the terminal carried by the user. When the user needs to return to the dress brand store X for women, the gift store Y, and the cosmetic store Z to show the payment voucher and get the dress, gift, and cosmetic picked out and bought by the user, the user only remembers a location of the cosmetic store Z that is closest to the checkout counter, but cannot remember locations of the dress brand store X for women and the gift store Y. The user shoots a panoramic photo of a location of the terminal using the application that is installed in the terminal and for acquiring location information. The terminal determines an identifier of the cosmetic store Z, an identifier of the checkout counter, and several other identifiable identifiers according to the panoramic photo shot by the user, and deduces a location of the terminal, that is, location information of the terminal, according to the identifiers, and the terminal also sends a first request message including an identifier of the terminal and the location information of the terminal to the server. After the server receives the first request message, the server obtains, according to the foregoing three stored events related to the terminal and corresponding conditional probabilities (where the conditional probabilities are obtained by means of calculation by the server according to a large quantity of collected data uploaded by the terminal), that a next behavior, which most likely occurs, of the user may be as follows: (a) where is a nearest escalator? (b) where is a nearest restaurant? and (c) return to the stores that have been visited?

The user selects a behavior corresponding to the option of "(c) return to the stores that have been visited?". After the server receives the behavior selected by the user, the server selects navigation-class AR content from pre-stored AR content according to the behavior "return the stores that have been visited", where the navigation-class AR content includes significant markers near the stores that the user has visited, so that the server may generate, according to the recorded events related to the user, the indoor map of the shopping center, and the data about the POIs in the shopping center, a map of routes from a location of the user to the dress brand store X for women, the gift store Y, and the cosmetic store Z separately, and identify significant markers between any two stores. Then the server sends the information to the terminal, and the terminal displays the significant markers and corner information on the route map to the user in an AR form. The user finds the dress brand store X for women, the gift store Y, and the cosmetic store Z with the help of the application program, and separately gets the dress, the gift, and the cosmetic picked out and bought by the user. The terminal records the event of choosing, by the user, to return to the stores that have been visited, and sends the event to the server, so that the server classifies, collects statistics on, and analyzes the event.

Implementation Scenario 2: Museum:

To relieve the pressure brought by insufficient workers and increasingly more visitors, a self help system is deployed for a museum according to the technical solutions provided in the present disclosure, to provide self help to visitors, where the self help system may include an application that is installed in a terminal and for acquiring location information and a server running in the background. After a foreign visitor comes to the museum, because the application for acquiring location information provided in the technical solutions of the present disclosure is installed in a terminal carried by the visitor, the visitor first uses the terminal to get, at a service counter, a museum ticket booked in advance, and the terminal records the event of getting the ticket by the visitor, and sends the event to the server, so that the server may classify, collect statistics on, and analyze the event. The visitor uses the terminal to read an NFC poster at an entrance of a lobby on the first floor, the terminal obtains latest exhibition information and lecture information of the museum according to the read poster, and displays the exhibition information and the lecture information to the user, and the terminal records the event of reading the NFC poster by the visitor, and sends the event to the server, so that the server may classify, collect statistics on, and analyze the event. After the visitor enters the lobby on the first floor, the visitor is shocked by the magnificence of the museum, and therefore, the visitor is confused and does not know which place the visitor needs to start visiting from. As a result, the visitor shoots a panoramic photo of a location of the terminal using the application that is installed in the terminal and for acquiring location information. The terminal extracts enough features from the panoramic photo shot by the visitor, and accordingly determines that the terminal is located in the lobby on the first floor, and the terminal sends a first request message including an identifier of the terminal and the location of the terminal, that is, location information of the terminal, to the server. After the server receives the first request message, the server deduces, according to the foregoing two stored events related to the terminal and corresponding conditional probabilities (where the conditional probabilities are obtained by means of calculation by the server according to a large quantity of collected data uploaded by the terminal), that a next behavior, which most likely occurs, of the visitor may be as follows: (a) visit an exhibition that is being held in the museum and has richest exhibits—exhibition of ancient China; (b) visit a free exhibition that is being held in the museum, such as a jadeware exhibition, a coin exhibition, an exhibition of Chinese traditional painting and calligraphy, and the like; (c) visit a chargeable exhibition that is being held in the museum, such as Florence and Renaissance—exhibition of famous works; and (d) attend a free lecture that is being held in the museum, such as an introduction to china appraisal.

The visitor is relatively interested in antique appraisal and thinks that it is a rare opportunity, so the visitor selects the option of "(d) attend a free lecture that is being held in the museum, such as an introduction to china appraisal". The server sends, to the terminal according to the behavior selected by the visitor, information related to the behavior, such as related introduction about an expert of the lecture, content of the lecture, a site at which the lecture is held, and that a specific location at which the lecture is held is an open-air teahouse on the top floor, and the terminal displays the foregoing information related to the lecture and a map of a route to the location at which the lecture is held to the visitor in an AR form. Under the guidance of the application program, the visitor goes to the top floor and attends the lecture of the introduction to china appraisal. The terminal records the event of choosing, by the visitor, to attend the free lecture being held in the museum, and sends the event to the server, so that the server may classify, collect statistics on, and analyze the event.

The system for screening AR content according to this embodiment of the present disclosure can dynamically select, in real time according to a behavior selected by a user, augmented reality content that can most meet a requirement of the user, thereby meeting an information requirement of the user.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor (processor) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for screening augmented reality (AR) content, comprising:
    shooting, by a terminal, a panoramic photo of a location of the terminal when an application that is in the terminal and for acquiring location information is triggered;
    identifying a first target in the panoramic photo;
    determining related information of the first target;
    determining location information of the terminal based on the first target identified in the panoramic photo;
    sending, by the terminal, a first request message to a server, wherein the first request message carries an identifier of the terminal and the location information of the terminal;
    receiving, by the terminal, a first response message that carries at least one behavior and is from the server, wherein the at least one behavior is determined by the server according to the identifier of the terminal, the location information of the terminal, and conditional probabilities of different behaviors;
    displaying, at the terminal, the at least one behavior;
    receiving, at the terminal, a user selection of a first behavior in the at least one behavior;
    sending, by the terminal, a second request message to the server, wherein the second request message indicates the first behavior;
    receiving, by the terminal, a second response message that carries AR content corresponding to the first behavior and that is from the server;
    combining, by the terminal, the first target and the AR content according to the related information of the first target; and
    presenting, by the terminal, the combined first target and AR content.

2. The method for screening AR content according to claim 1, wherein before shooting, by the terminal, the panoramic photo of the location of the terminal when the application that is in the terminal and for acquiring location information is triggered, the method further comprises:
    reading, by the terminal, tag information of a second target; and
    sending, by the terminal, a first record event to the server, wherein the first record event triggers the server to classify the first record event according to the identifier of the terminal and the location information of the terminal and determine a probability of the first record event, and the first record event comprises a behavior of reading the tag information of the second target by the terminal.

3. The method for screening AR content according to claim 2, wherein after reading, by the terminal, the tag information of the second target, the method further comprises:
    acquiring, by the terminal, an identifier of the second target according to the tag information of the second target;
    sending, by the terminal to the server, a third request message that carries the identifier of the second target; and
    receiving, by the terminal, a third response message that carries location information of the second target and is returned by the server.

4. The method for screening AR content according to claim 3, wherein the first record event further comprises the location information of the second target.

5. The method for screening AR content according to claim 1, wherein after sending, by the terminal, the second request message to the server, the method further comprises sending, by the terminal, a second record event to the server, wherein the second record event triggers the server to classify the second record event according to the identifier of the terminal and the location information of the terminal and determine a probability of the second record event and a conditional probability of the second record event, and wherein the second record event comprises a behavior of selecting the first behavior in the at least one behavior.

6. The method for screening AR content according to claim 5, wherein the related information of the first target comprises location information of the first target, and wherein the second record event further comprises the location information of the first target.

7. The method for screening AR content according to claim 1, wherein the AR content comprises at least one of image-text information, audiovisual information, or a three-dimensional (3D) image.

8. A method for screening augmented reality (AR) content, comprising:
    receiving, by a server, a first request message from a terminal, wherein the first request message carries an identifier of the terminal and location information of the terminal;
    determining, by the server, at least one behavior according to the identifier of the terminal, the location information of the terminal, and conditional probabilities of different behaviors;
    sending, by the server to the terminal, a first response message that carries the at least one behavior;
    receiving, by the server, a second request message from the terminal, wherein the second request message indicates a first behavior, and wherein the first behavior is a behavior selected in the at least one behavior; and
    sending, by the server to the terminal, a second response message that carries AR content corresponding to the first behavior, wherein the second response message triggers the terminal to combine a first target and the AR content according to the related information of the first target and present the combined first target and AR content, and wherein the location information of the terminal and the related information of the first target are determined according to a panoramic photo of a location of the terminal after the terminal shoots the panoramic photo when an application that is in the terminal and for acquiring location information is triggered.

9. The method for screening AR content according to claim 8, wherein before receiving, by the server, the first request message from the terminal, the method further comprises:

receiving, by the server, a first record event from the terminal, wherein the first record event comprises a behavior of reading tag information of a second target by the terminal;

classifying, by the server, the first record event according to the identifier of the terminal and the location information of the terminal; and determining a probability of the first record event.

10. The method for screening AR content according to claim 9, wherein before receiving, by the server, the first record event from the terminal, the method further comprises:

receiving, by the server, a third request message that carries an identifier of the second target and is from the terminal, wherein the identifier of the second target is acquired by the terminal according to the tag information of the second target; and sending, by the server to the terminal, a third response message that carries location information of the second target.

11. The method for screening AR content according to claim 10, wherein the first record event further comprises the location information of the second target.

12. The method for screening AR content according to claim 8, wherein after receiving, by the server, the second request message from the terminal, the method further comprises:

receiving, by the server, a second record event from the terminal, wherein the second record event comprises a behavior of selecting the first behavior in the at least one behavior;

classifying, by the server, the second record event according to the identifier of the terminal and the location information of the terminal; and determining a probability of the second record event and a conditional probability of the second record event.

13. The method for screening AR content according to claim 12, wherein the related information of the first target comprises location information of the first target, and wherein the second record event further comprises the location information of the first target.

14. A terminal, comprising:

a processor configured to:
 shoot a panoramic photo of a location of the terminal when an application that is in the terminal and for acquiring location information is triggered;
 identify a first target in the panoramic photo;
 determine related information of the first target; and
 determine location information of the terminal based on the first target identified in the panoramic photo;

a transmitter configured to send a first request message to a server, wherein the first request message carries an identifier of the terminal and the location information determined by the processor;

a receiver configured to receive a first response message that carries at least one behavior and is from the server, wherein the at least one behavior is determined by the server according to the identifier of the terminal, the location information of the terminal, and conditional probabilities of different behaviors;

a display unit configured to present the at least one behavior; and wherein the processor is further configured to receive a user selection of a first behavior in the at least one behavior, the transmitter is further configured to send a second request message to the server, wherein the second request message indicates the first behavior, the receiver is further configured to receive a second response message that carries AR content corresponding to the first behavior and that is from the server, the processor is further configured to combine the first target and the AR content according to the related information determined by the processor, and the display unit is further configured to present the combined first target and AR content.

15. The terminal according to claim 14, wherein the processor is further configured to read tag information of a second target before shooting the panoramic photo of the location of the terminal; and the transmitter is further configured to send a first record event to the server, wherein the first record event triggers the server to classify the first record event according to the identifier of the terminal and the location information of the terminal and determine a probability of the first record event, and wherein the first record event comprises a behavior of reading the tag information of the second target by the determining unit.

16. The terminal according to claim 15, wherein after the processor reads the tag information of the second target, the processor is further configured to acquire an identifier of the second target according to the tag information of the second target;

the transmitter is further configured to send, to the server, a third request message that carries the identifier of the second target; and the receiver is further configured to receive a third response message that carries location information of the second target and is returned by the server.

17. The terminal according to claim 16, wherein the first record event sent by the transmitter further comprises the location information of the second target.

18. The terminal according to claim 14, wherein the transmitter is further configured to send a second record event to the server after sending the second request message to the server, wherein the second record event triggers the server to classify the second record event according to the identifier of the terminal and the location information of the terminal and determine a probability of the second record event and a conditional probability of the second record event, and wherein the second record event comprises a behavior of selecting the first behavior in the at least one behavior.

19. The terminal according to claim 18, wherein the related information, which is determined by the determining unit, of the first target comprises location information of the first target, and wherein the second record event sent by the transmitter further comprises the location information of the first target.

20. The terminal according to claim 14, wherein the AR content comprises at least one of image-text information, audiovisual information, or a three-dimensional (3D) image.

* * * * *